United States Patent
Mou et al.

(10) Patent No.: US 10,961,696 B2
(45) Date of Patent: Mar. 30, 2021

(54) FABRICATED INTELLIGENT JOINT PROVIDED WITH PARTICLE DAMPING CHAMBERS FOR ENERGY DISSIPATION AND ASSEMBLY METHOD

(71) Applicant: Qingdao University of Technology, Qingdao (CN)

(72) Inventors: Ben Mou, Qingdao (CN); Yan Wang, Qingdao (CN); Yi Liu, Qingdao (CN); Ye Liu, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 0 days.

(21) Appl. No.: 16/624,909

(22) PCT Filed: Jul. 5, 2018

(86) PCT No.: PCT/CN2018/094606
§ 371 (c)(1),
(2) Date: Dec. 20, 2019

(87) PCT Pub. No.: WO2019/200726
PCT Pub. Date: Oct. 24, 2019

(65) Prior Publication Data
US 2021/0047825 A1   Feb. 18, 2021

(30) Foreign Application Priority Data

Apr. 20, 2018   (CN) .......................... 201810358579.7

(51) Int. Cl.
*E04B 1/24*   (2006.01)
*G01M 5/00*   (2006.01)
*E04H 9/02*   (2006.01)

(52) U.S. Cl.
CPC .......... *E04B 1/2403* (2013.01); *E04H 9/0237* (2020.05); *G01M 5/0083* (2013.01); *E04B 2001/2415* (2013.01)

(58) Field of Classification Search
CPC .. E04H 9/0237; G01M 5/0083; E04B 1/2403; E04B 2001/2415; E04B 1/1903;
(Continued)

(56) References Cited

U.S. PATENT DOCUMENTS 3,315,995 A * 4/1967 Hossli ................... E04B 1/5806
                                                                          403/387
3,938,297 A * 2/1976 Sato ......................... F16B 9/052
                                                                          403/188
(Continued)

FOREIGN PATENT DOCUMENTS

| CN | 1241668 A | 1/2000 |
| CN | 103669594 A | 3/2014 |

(Continued)

*Primary Examiner* — Brian E Glessner
*Assistant Examiner* — Adam G Barlow
(74) *Attorney, Agent, or Firm* — Bayramoglu Law Offices LLC (57) ABSTRACT

A fabricated intelligent joint provided with particle damping chambers for energy dissipation includes a core steel frame, an external fully-fabricated steel pipe column, a fully-fabricated annular beam-column connecting assembly, a structural health detection system and particle damping chambers. The core steel frame is located in the external fully-fabricated steel pipe column, is concentric with the external fully-fabricated steel pipe column and comprises a circular hollow steel keel and a plurality of protruding steel plate wings. The external fully-fabricated steel pipe column is formed by splicing a plurality of arc steel pipe column sheets. A space between the external fully-fabricated steel pipe column and the circular hollow steel keel of the core steel frame has the particle damping chambers installed (Continued)

therein and has concrete poured therein. A large quantity of spherical rubber particles is contained in the particle damping chambers.

10 Claims, 9 Drawing Sheets

(58) Field of Classification Search
CPC .... E04B 1/5812; E04B 1/1918; E04B 1/1909; E04B 1/1921
USPC ..... 52/261, 280, 282.2, 648.1, 649.1, 649.2, 52/655.1, 665, 704, 838, 839; 403/170, 403/171, 176, 381, 341, 342, 347
See application file for complete search history.

(56) References Cited

U.S. PATENT DOCUMENTS

| | | | | |
|---|---|---|---|---|
| 4,558,968 | A * | 12/1985 | Meickl | E04B 1/58 403/174 |
| 5,238,321 | A * | 8/1993 | Jarjoura | A47B 57/44 403/172 |
| 7,637,076 | B2 * | 12/2009 | Vaughn | E04B 1/24 52/838 |
| 8,451,013 | B1 * | 5/2013 | Hsiao | G01M 5/0083 324/691 |
| 8,640,419 | B2 * | 2/2014 | Lee | E04H 9/025 52/649.2 |
| 9,458,619 | B2 * | 10/2016 | Bowron | E04B 1/1903 |
| 10,179,991 | B2 * | 1/2019 | Houghton | E04B 1/2403 |
| 10,253,492 | B2 * | 4/2019 | Uno | E04B 1/24 |
| 10,633,851 | B2 * | 4/2020 | Mou | E04B 1/185 |
| 10,851,537 | B2 * | 12/2020 | Zhang | E04B 1/2403 |
| 2003/0041549 | A1 * | 3/2003 | Simmons | E04B 1/2403 52/655.1 |
| 2013/0232758 | A1 * | 9/2013 | Pond | E04B 1/2612 29/428 |
| 2018/0094419 | A1 * | 4/2018 | Houghton | E04B 1/2403 |
| 2018/0245329 | A1 * | 8/2018 | Yu | E04B 1/2403 |

FOREIGN PATENT DOCUMENTS

| | | |
|---|---|---|
| CN | 205577124 U | 9/2016 |
| CN | 206396915 U | 8/2017 |
| JP | 2002038755 A | 2/2002 |
| KR | 20000040240 A | 7/2000 |

* cited by examiner

FABRICATED INTELLIGENT JOINT PROVIDED WITH PARTICLE DAMPING CHAMBERS FOR ENERGY DISSIPATION AND ASSEMBLY METHOD

CROSS REFERENCE TO THE RELATED APPLICATIONS

This application is the national phase entry of International Application No. PCT/CN2018/094606, filed on Jul. 5, 2018, which is based upon and claims priority to Chinese Patent Application No. 201810358579.7, filed on Apr. 20, 2018, the entire contents of which are incorporated herein by reference.

TECHNICAL FIELD

The invention relates to a fabricated intelligent joint provided with particle damping chambers for energy dissipation and an assembly method, and belongs to the technical field of structural engineering.

BACKGROUND

With the development of economy and the improvement of living standards, the requirement of people for housing conditions is becoming higher and higher from the requirement for having houses to live therein to the requirements for good houses, that is, the living space should be not only available, but also should be spacious, comfortable and safe. Accordingly, higher requirements are put forward for the house construction technology. In recent years, various novel building techniques have emerged endlessly with the development of building industrialization, wherein the fabricated steel-structure building technique has become mature after years of development. Fabricated steel-structure buildings have been widely accepted by people thanks to their advantages of being convenient to construct, environmentally friendly in construction, good in seismic performance and capable of realizing steel reserves, and the like.

The performance of steel-structure joints as key stress components of a fabricated steel structure has a decisive influence on the performance of the whole structure. However, existing fabricated steel-structure building joint techniques still have the following drawbacks: first, although the steel-structure joints are easy to construct compared with reinforced concrete structures, there are still certain processes having high requirements for the skills of constructors such as welding and the quality cannot be kept consistent due to field operation by the constructors; second, the assembly degree is low, and components are too large and difficult to transport; third, the seismic performance is poor, and under the effect of an earthquake, weld joints may crack, or the whole joints may be deformed or irrecoverably destroyed; and fourth, the degree of intelligence is low, and neither the performance of steel pipe columns nor the performance of concrete inside can be effectively monitored and evaluated.

SUMMARY

The objective of the invention is to provide a fabricated intelligent joint provided with particle damping chambers for energy dissipation and an assembly method to solve the problems of low assembly degree, unsatisfactory seismic performance and incapacity of evaluation of self-performance of fabricated steel-structure joints in the prior art.

The invention is implemented through the following technical solution:

A fabricated intelligent joint provided with particle damping chambers for energy dissipation comprises a core steel frame, an external fully-fabricated steel pipe column, a fully-fabricated annular beam-column connecting assembly, a structural health detection system and particle damping chambers, wherein the core steel frame is located in the external fully-fabricated steel pipe column, is concentric with the external fully-fabricated steel pipe column and comprises a circular hollow steel keel and a plurality of protruding steel plate wings; the external fully-fabricated steel pipe column is formed by splicing a plurality of arc steel pipe column sheets; the fully-fabricated annular beam-column connecting assembly comprises a plurality of pairs of arc connecting tiles and a plurality of core beam-column connecting pieces, and the arc connecting tiles are connected through bolts to formed a cylindrical external reinforcing ring; the arc connecting tiles include upper arc connecting tiles and lower arc connecting tiles, and the upper arc connecting tiles and the lower arc connecting tiles are spliced to form upper and lower external reinforcing rings to hoop the external fully-fabricated steel pipe column, and the upper and lower external reinforcing rings are located on upper and lower sides of the core beam-column connecting pieces, are connected with the core beam-column connecting pieces and are connected with the external fully-fabricated steel pipe column with bolts through the core beam-column connecting pieces. Steel columns are connected with the fully-fabricated annular beam-column connecting assembly through bolts to form the whole joint. A space between the external fully-fabricated steel pipe column and the circular hollow steel keel of the core steel frame has the particle damping chambers installed therein and has concrete poured therein. A large quantity of spherical rubber particles is contained in the particle damping chambers, The particle damping chambers contain a large quantity of spherical rubber particles and sufficient motion spaces, and the spherical rubber particles move in the particle damping chambers to collide with one another to fulfill a good energy-dissipation effect.

Shells of the particle damping chambers are made from light high-strength fiber materials such as refractory fiber plastic, aluminum alloy, carbon fibers, and other conventional materials, and have the advantages of high strength and low weight.

The particle damping chambers are located in a gap between the external fully-fabricated steel pipe column and the core steel frame and are distributed in four columns. The number of the particle damping chambers is determined according to the number of the column.

The damping chambers and the concrete are alternately distributed in the gap between the core steel frame and the external fully-fabricated steel pipe column, so that the performance of the particle damping chambers is brought into full play.

T-shaped connecting teeth are arranged between the protruding steel plate wings outside a circular hollow steel pipe within the full length of the protruding steel plate wings, T-shaped slides matched with the T-shaped connecting teeth are arranged on the inner sides of the particle damping chambers, and the particle damping chambers are connected with the core steel frame through the T-shaped slides and the T-shaped connecting teeth.

The structural health detection system comprises a principal line, a wire, fiber bragg grating (FBG) intelligent sensing elements, a processor, a long-life power supply and a wireless data transmitter and is located on a principal line pipe in the circular hollow steel keel in the core steel frame; an annular date integrated package comprises the processor, the wireless data transmitter and the long-life power supply and tightly wraps the principal line pipe, and the wire and a principal line connected with the wire are wrapped in the principal line pipe which is connected with the annular data integrated block through a hole formed in the principal line pipe; a wire hole is formed in the hollow steel keel, and the wire penetrates through the wire hole to connect the FBG intelligent elements to the processor; and the FBG intelligent sensing elements and the corresponding connecting wire are embedded in the fiber concrete injected between the particle damping chambers.

The structural health detection system further comprises a strain gauge attached to the inner wall of the steel pipe and is connected with the processor on the annular data integrated package through the wire.

The strain gauge and the wire on the inner wall of the circular hollow steel keel of the core steel frame are assembled and debugged in a factory.

The annular data integrated package is wrapped with polyurea skin and has the characteristics of being waterproof and resistant to low temperature and corrosion.

The circular steel frame concrete joint further comprises a core steel frame which is located in the steel pipe column and is centrosymmetric with respect to the center of the steel pipe column.

Column sheet connecting teeth are arranged on one side of the arc steel pipe column sheets of the external fully-fabricated steel pipe column, column sheet sliding grooves matched with the column sheet connecting teeth are formed in the other side of the arc steel pipe column sheets of the external fully-fabricated steel pipe column, and the column sheets are spliced end to end through the column sheet connecting teeth and the column sheet sliding grooves to form the steel pipe column.

The core steel frame consists of a circular hollow steel keel and a plurality of protruding steel plate wings uniformly surrounding the steel keel, connecting teeth are arranged at free ends of the protruding steel plate wings and are continuously distributed within the full length of the steel plate wings, and a plurality of sliding grooves which are matched with the clamping teeth of the protruding steel plate wings are formed in the inner sides of the arc steel pipe column sheets.

Each arc connecting tile comprises an arc end plate connected with the steel pipe column and a plurality of connecting plates perpendicularly connected to the two sides and bottom side of the end plate. The adjacent arc connecting tiles are connected through the connecting plates. Each core beam-column connecting piece comprises an arc inner plate connected with the steel pipe column and an outer plate perpendicular to the inner plate. The adjacent core beam-column connecting pieces are connected through the outer plates.

Lower planes of the upper arc connecting tiles and upper planes of the lower arc connecting tiles are provided with T-shaped teeth, and T-shaped grooves matched with the T-shaped teeth are arranged on upper and lower surfaces of the core beam-column connecting pieces.

Splicing joints of the adjacent arc end plates are staggered with splicing joints of the column sheets of the external fully-fabricated steel pipe column to hoop the external fully-fabricated steel pipe column.

The number of the upper arc connecting tiles in the arc connecting tiles is equal to that of the lower arc connecting tiles in the arc connecting tiles, and the upper arc connecting tiles correspond to the lower arc connecting tiles; and the number of the pairs of the arc connecting tiles is equal to that of the core beam-column connecting pieces.

The number of the protruding steel plate wings of the core steel frame is equal to that of the external fully-fabricated steel pipe column sheets.

A plurality of circular through holes are formed in the protruding steel plate wings of the core steel frame and is used for pouring concrete and reducing the self-weight.

The external fully-fabricated steel pipe column comprises a plurality of arc steel pipe column sheets, and every two adjacent arc steel pipe column sheets are connected to form a cylinder, wherein the number of the arc steel pipe column sheets is generally 2, 3 or 4; and if the number of the column sheets constituting the external fully-fabricated steel pipe column is N, the radian of each column sheet is 360°/N.

Each core beam-column connecting piece comprises an arc inner plate and an outer arc plate perpendicular to the inner plate; the number of core beam-column connecting pieces is more than one, every two adjacent core beam-column connecting pieces are spliced to form a cylinder, and the number of the core beam-column connecting pieces is generally 2, 3, or 4; if the number of the core beam-column connecting pieces is N, the radian of each arc inner plate is 360°/N. The core beam-column connecting pieces are suitable for steel-structure buildings with different angles formed between beams.

An assembly method of a fabricated intelligent joint provided with particle damping chambers for energy dissipation comprises the following steps:

(1) Inspection of a structural health detection system: a wire having an end connected with the strain gauge in the hollow steel pipe of the core steel frame and an end attached to end openings of the sections, located in the circular hollow steel keel, of the FBG intelligent sensing elements is connected to an annular data integrated package, and the structural health detection system operates to be inspected;

(2) Installation of the structural health detection system: after operation and inspection, the annular data integrated package is disposed around the principal line pipe which is placed in the circular hollow steel keel of the core steel frame;

(3) Positioning of the core steel frame: the core steel frame is positioned according to the position and height of a column, and core beam-column connecting pieces are aligned to bolt holes to be connected with column sheets according to a design height of structural beams;

(4) Assembly of the external fully-fabricated steel pipe column: sliding grooves in the first external fully-fabricated steel pipe column sheet are placed above connecting teeth of a protruding steel plate wing of the core steel frame to be aligned to the connecting teeth, and then the column sheet is slid along the sliding grooves to a specific position; remaining external fully-fabricated steel pipe column sheets are operated in the same way, and column sheet connecting teeth between the column sheets are aligned to the column sheet sliding grooves and are then slid to specific positions to form the external fully-fabricated steel pipe column;

(5) Installation of a fully-fabricated annular beam-column connecting assembly: the core beam-column connecting pieces are connected with the external fully-fabricated steel pipe column sheets through bolts;

(6) Installation of particle damping chambers: the particle damping chambers are installed in a space between the circular hollow steel keel of the core steel frame and the external fully-fabricated steel pipe column;

(7) Concrete pouring: fiber concrete is poured above the particle damping chambers by a thickness which is not greater than that of the particle damping chambers;

(8) Installation of sensors: Step (6) and Step (7) are repeated until the column is half filled; after one particle damping chamber is installed, fiber concrete is poured by half of the thickness of the fiber concrete, the end of the wire outside an end opening of the circular hollow steel keel is connected with one FBG intelligent sensing element via a wire hole to be placed above the poured concrete, and concrete is poured again by the other half to bury the FBG intelligent sensing element; then the particle damping chamber is slid into the space between the circular hollow steel keel of the core steel frame and the external fully-fabricated steel pipe column to be located above the concrete and make contact with the concrete, and then fiber concrete is poured; the step is repeated to sequentially bury the remaining FBG intelligent sensing elements; and the step is performed in four spaces formed by the circular hollow steel keel of the core steel frame and the external fully-fabricated steel pipe column until the space in the column is full of the fiber concrete and the particle damping chambers;

(9) Installation of the arc connecting tiles: T-shaped teeth of the upper arc connecting tiles are slid in position along T-shaped sliding grooves in upper sides of the core beam-column connecting pieces, and T-shaped teeth of the lower arc connecting tiles are slid in position along T-shaped sliding grooves in lower sides of the core beam-column connecting pieces, so that upper and lower external reinforcing rings are formed; the arc connecting tiles are connected through bolts; and the steel beams and the core beam-column connecting pieces are connected through bolts; and (10) Operation of the structural health detection system.

In Step (6), T-shaped slides of the particle damping chamber are aligned to T-shaped connecting teeth outside the hollow steel pipe to slide the particle damping chamber to the bottom.

In step (8), when the concrete is poured, the wire connected with the FBG intelligent sensing elements has an end attached to the outer side of an end opening of the circular hollow steel keel, an end attached to the inner side of the end opening of the circular hollow steel keel, and a middle penetrating through the wire hole.

The invention has the following beneficial effects:

(1) The fabricated steel-structure joint of the invention adopts the particle damping chambers for the first time, thereby having a good energy-dissipation effect and good seismic performance.

(2) The joint of the invention has the integrated structural health detection system which is able to continuously detect the state of the joint in real time, so that intelligent management of the life cycle of a building is achieved.

(3) The core steel frame of the invention adopts the bionic design and is designed according to animal skeletons, thereby being high in strength, low in weight, and capable of saving materials; and the strength of the column and the seismic performance of the whole joint are guaranteed.

(4) The joint of the invention completely avoids field welding and adopts fully-fabricated connection, the assembly degree of components is high, transportation is convenient, and the construction efficiency of the joint is improved; and all components of the joint are fabricated in a factory and assembled in site, and the concrete is poured in site, so that the influence of field construction on the quality is minimized.

(5) The joint of the invention is provided with upper and lower external reinforcing rings, so that stress concentration of the joint region is effectively reduced, and the fully-fabricated steel pipe column is tightened to fulfill a strong-column and weak-beam effect.

(6) The fully-fabricated annular beam-column connecting assembly adopted by the invention is flexible, highly universal, and suitable for structures with different numbers of beams and different angles between beams.

In the figures: 1, core steel frame; 2, external fully-fabricated steel pipe column; 3, core beam-column connecting piece; 4, upper arc connecting tile; 5, lower arc connecting tile; 6, steel beam; 7, protruding steel plate wing; 8, circular hollow steel keel; 9, protruding steel plate wing end connecting tooth; 10, T-shaped connecting tooth; 11, principal line pipe; 12, annular data integrated package; 13, wire; 14, circular through hole; 15, fiber concrete; 16, FBG intelligent sensing element; 17, particle damping chamber; 18, strain gauge; 19, T-shaped slide; 20, arc connecting tile connecting teeth; 21, core beam-column connecting piece sliding groove; 22, processor; 23, long-life power supply; 24, wireless data transmitter.

DETAILED DESCRIPTION OF THE EMBODIMENTS

The invention is further described below in combination with the accompanying drawings.

Embodiment 1

As shown in FIG. 1-FIG. 9, a fabricated intelligent joint provided with particle damping chambers for energy dissipation of the invention comprises a core steel frame 1, an external fully-fabricated steel pipe column 2, a fully-fabricated annular beam-column connecting assembly, a structural health detection system, and particle damping chambers 17, wherein the core steel frame is located in the external fully-fabricated steel pipe column, is concentric with the external fully-fabricated steel pipe column and comprises a circular hollow steel keel 8 and four protruding steel plate wings 7; the external fully-fabricated steel pipe column is formed by splicing four arc steel pipe column sheets; the fully-fabricated annular beam-column connecting assembly comprises four pairs of arc connecting tiles and four core beam-column connecting pieces 3, and the four pairs of arc connecting tiles are connected through bolts to form a cylindrical external reinforcing ring; and the arc connecting tiles include upper arc connecting tiles 4 and lower arc connecting tiles 5, and the upper arc connecting tiles 4 and the lower arc connecting tiles 5 are connected through bolts to form upper and lower external reinforcing rings to hoop the external fully-fabricated steel pipe column. Each arc connecting tile comprises an arc end plate connected with the steel pipe column and three connecting plates perpendicularly connected to the two sides and bottom side of the end plate. Each core beam-column connecting piece comprises an arc inner plate connected with the steel pipe column and an outer plate perpendicular to the inner plate. The number of the core beam-column connecting pieces is four, and the adjacent core beam-column connecting pieces are connected through bolts to form a cylindrical tubular hoop. Lower planes of the upper arc connecting tiles and upper planes of the lower arc connecting tiles are provided with T-shaped teeth, upper and lower surfaces of the core beam-column connecting pieces are provided with T-shaped grooves matched with the T-shaped teeth, and the upper and lower external reinforcing rings are connected with the core beam-column connecting pieces through the T-shaped teeth and the T-shaped grooves and are connected with the external fully-fabricated steel pipe column with bolts through the core beam-column connecting pieces. Each external fully-fabricated steel pipe column sheet has a central angle of 90°, and similarly, each arc connecting tile has a central angle of 90°. Steel beams 6 are connected with the fully-fabricated annular beam-column connecting assembly through bolts to form the whole joint.

A space between the external fully-fabricated steel pipe column and the circular hollow steel keel of the core steel frame has the particle damping chambers installed therein and has concrete poured therein; and a large quantity of spherical rubber particles is contained in the particle damping chambers. The particle damping chambers contain a large quantity of spherical rubber particles and have sufficient motion spaces, so that the spherical rubber particles move in the chambers to collide with one another to fulfill a good energy-dissipation effect. The particle damping chambers are located in a gap between the external fully-fabricated steel pipe column and the core steel frame and are distributed in four columns. The number of the particle damping chambers is determined according to the length of the column. The particle damping chambers and the concrete are alternately distributed in the gap between the core steel frame and the external fully-fabricated steel pipe column, so that the performance of the particle damping chambers is brought into full play.

Figure 1:
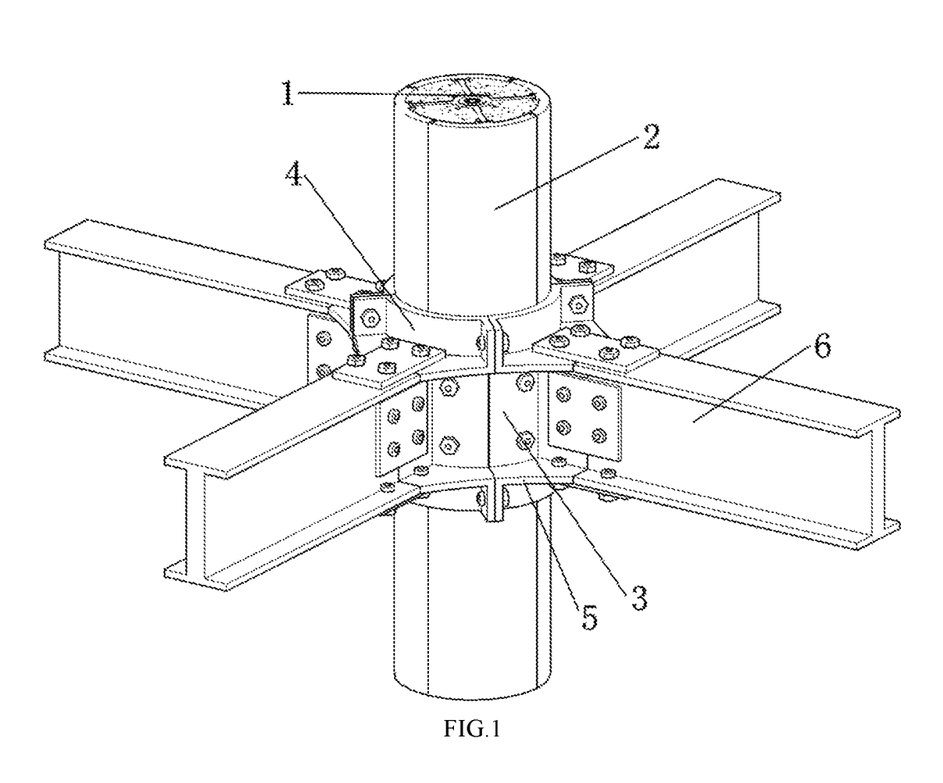
FIG. 1 is a structural view of the invention.
Figure 2:
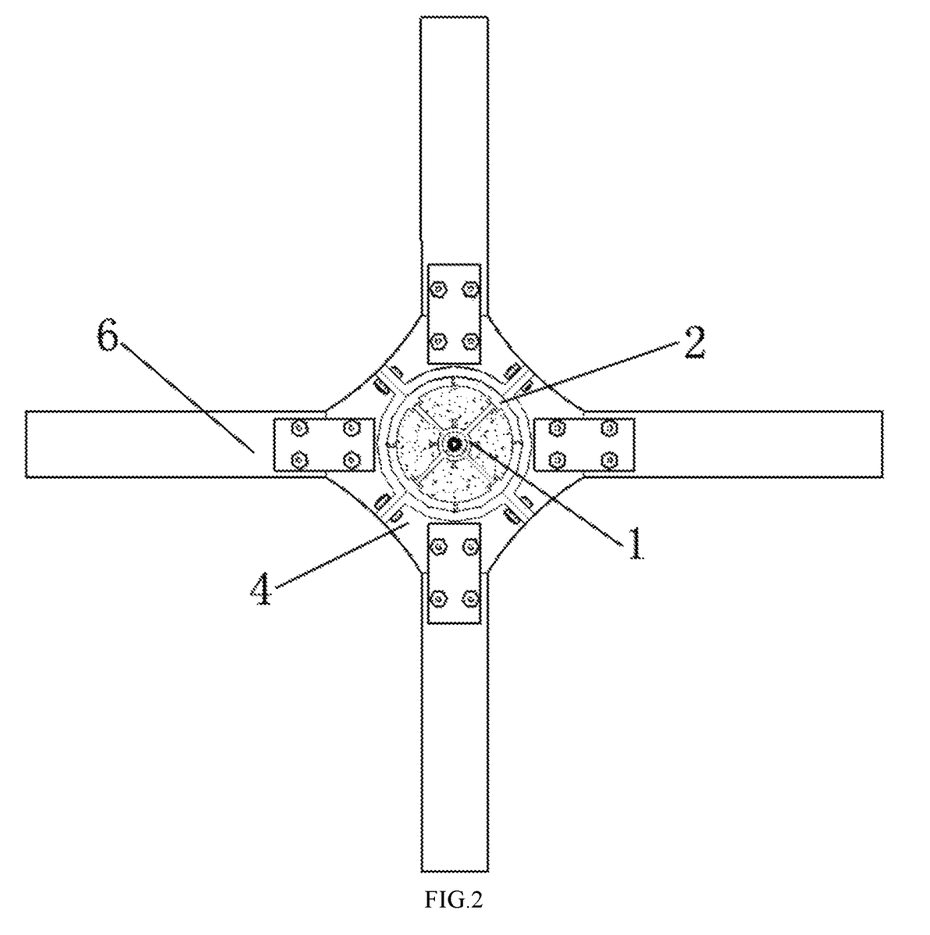
FIG. 2 is a top view of the invention.
Figure 3:
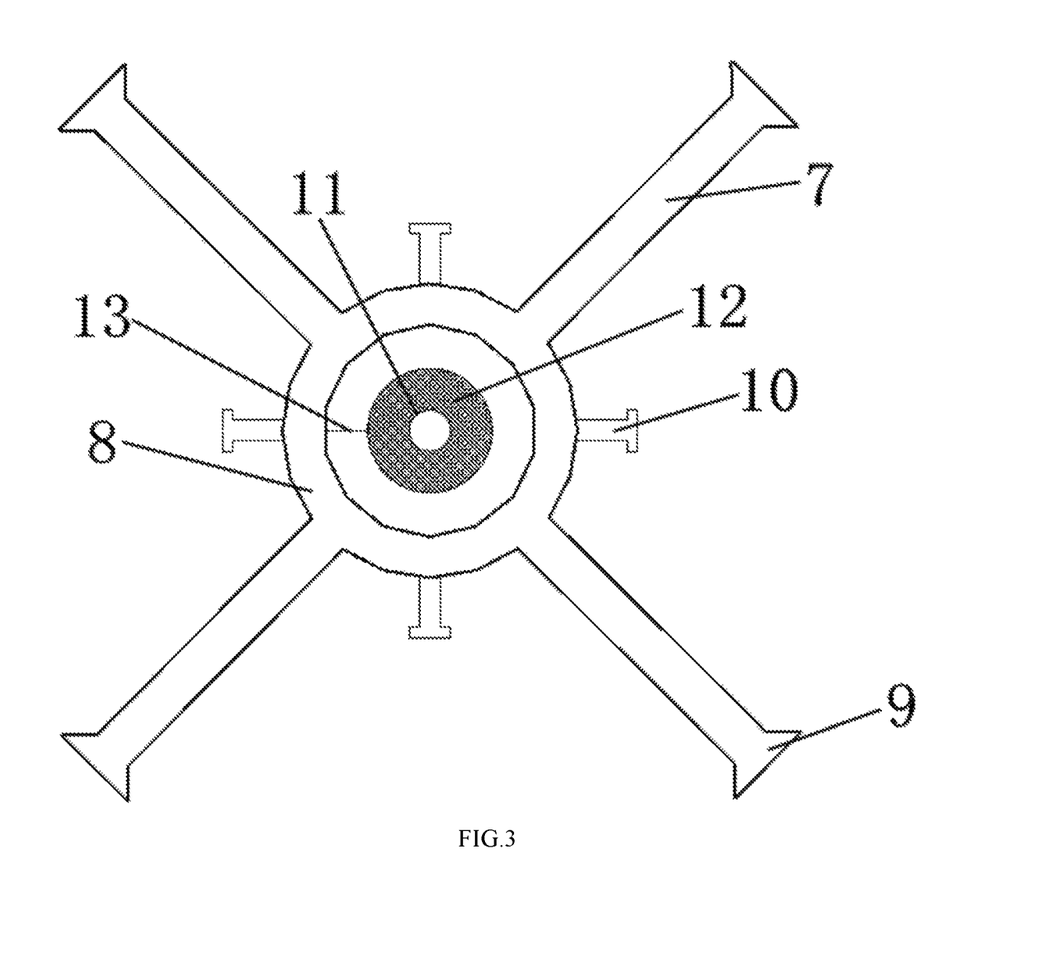
FIG. 3 is a structural view of a core steel frame.
Figure 4:
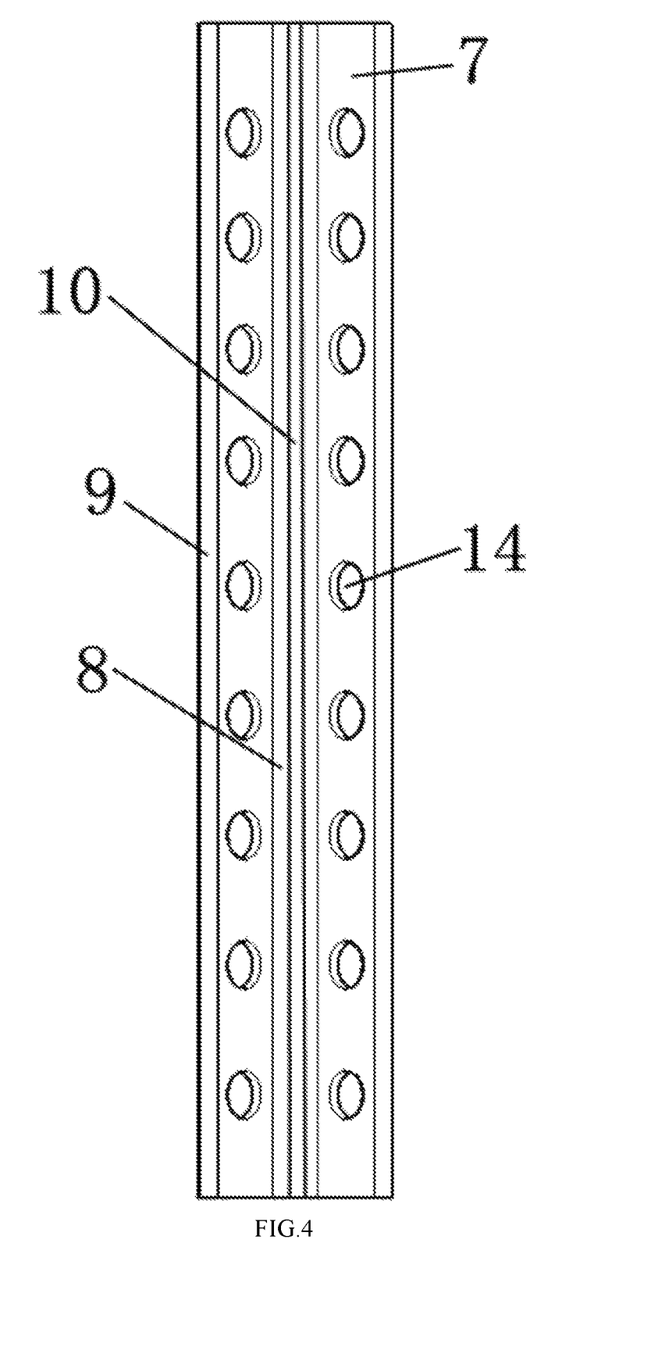
FIG. 4 is a front view of the core steel frame of the invention.

Each protruding steel plate wing of the core steel frame has a plurality of circular through holes 14 used for pouring the concrete.

A free end of each protruding steel plate wing is provided with protruding steel plate wing end connecting teeth 9 which are continuously distributed within the full length of the protruding steel plate wing, and a plurality of sliding grooves matched with the protruding steel plate swing clamping teeth are formed in the inner side of each arc steel pipe column sheet.

Figure 6:
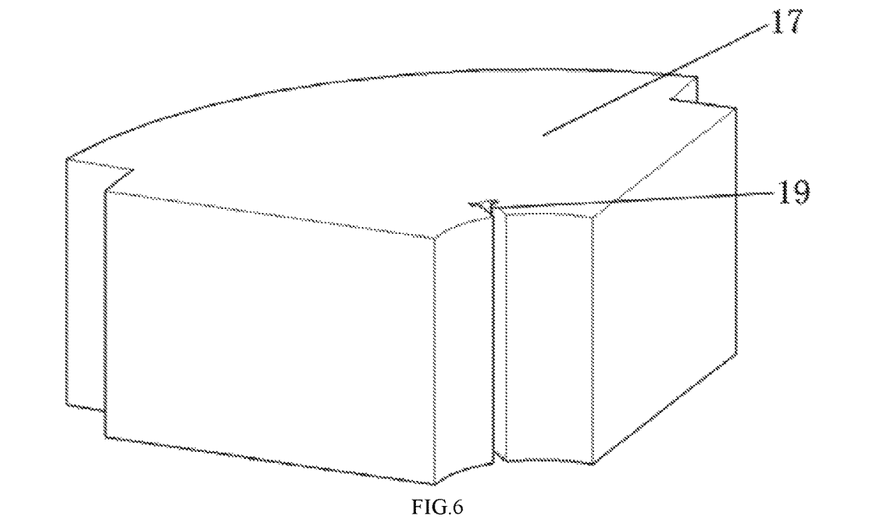
FIG. 6 is a perspective view of a particle damping chamber of the invention.

T-shaped connecting teeth 10 are arranged between the protruding steel plate wings outside a circular hollow steel pipe within the full length of the protruding steel plate wings, T-shaped slides matched with the T-shaped connecting teeth 10 are formed in the inner sides of the particle damping chambers, and the particle damping chambers are connected with the core steel frame through the T-shaped slides and the T-shaped connecting teeth.

Shells of the particle damping chambers are made from carbon fiber materials or other light high-strength fiber materials such as refractory fiber plastic, aluminum alloy and other conventional materials.

Embodiment 2

Figure 10:
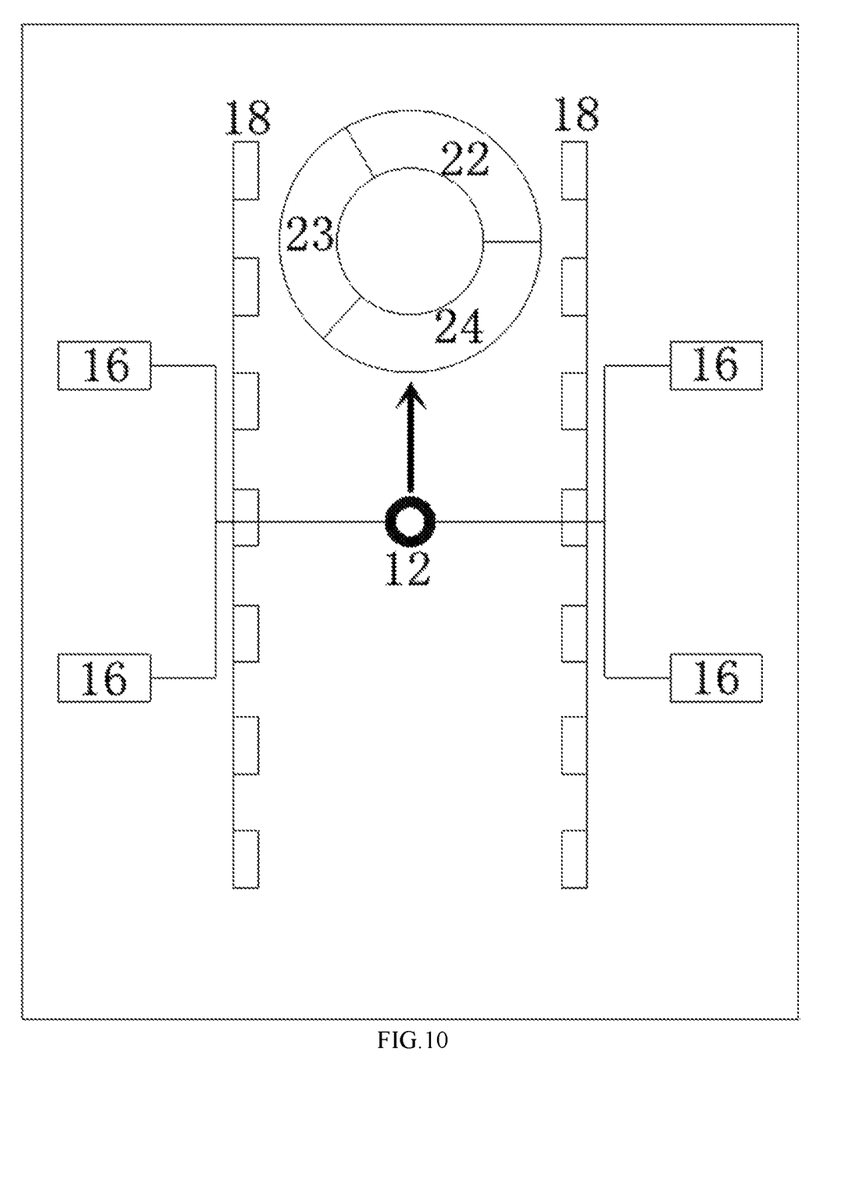
FIG. 10 is an architecture diagram of a structural health detection system of the invention.
Figure 11:
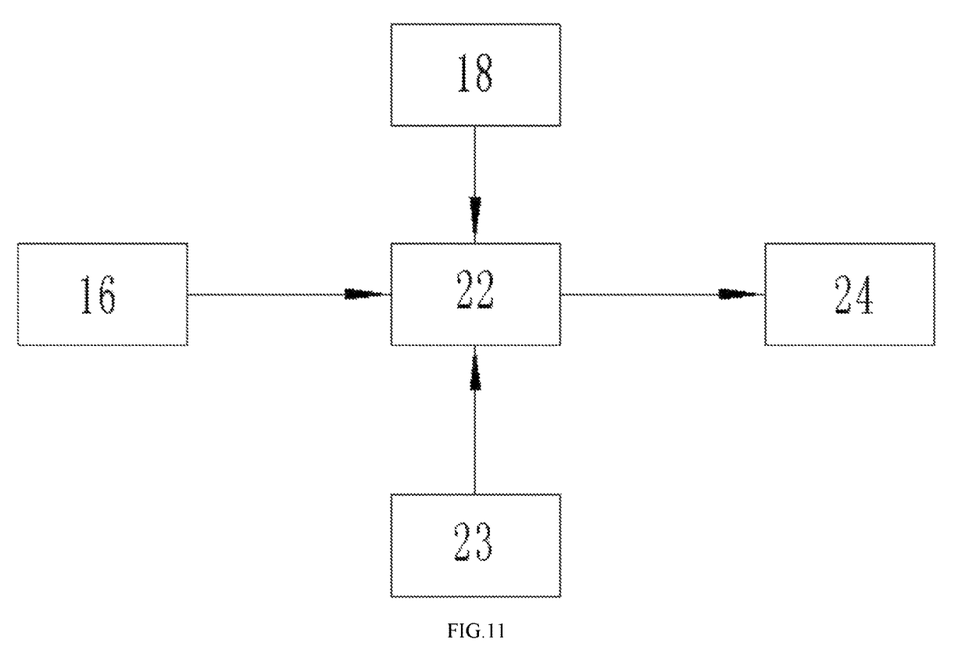
FIG. 11 is a transmission relation diagram of the structural health detection system of the invention.

As shown in FIG. 10-FIG. 11, the fabricated intelligent joint provided with particle damping chambers for energy dissipation of the invention further comprises a structural health detection system. The structural health detection system comprises a principal line, a wire, FBG intelligent sensing elements 16, a processor 22, a long-life power supply 23, and a wireless data transmitter 24 and is located on a principal line pipe 11 arranged in the circular hollow steel keel of the core steel frame. An annular data integrated package 12 comprises the processor, the wireless data transmitter and the long-life power supply and tightly wraps the principal line pipe. The wire 13 and the principal line connected with the wire are wrapped in the principal line pipe which is connected with the annular data integrated package via a hole formed in the principal line pipe. A wire hole is formed in the hollow steel keel, and the wire penetrates through the wire hole to connect the FBG sensing elements to the processor. The FBG sensing elements and the corresponding connecting wire are embedded in fiber concrete injected between the particle damping chambers. The FBG sensing elements are able to acquire information in the concrete and transmit the information to the annular data integrated package via the wire, and then the information is transmitted to the outside by the wireless data transmitter. The long-life power supply supplies power to the processor and the wireless data transmitter.

A strain gauge 18 and the wire on the inner wall of the circular hollow steel keel of the core steel frame are assembled and debugged in a factory.

The annular data integrated package is wrapped with polyurea skin and has the characteristics of being waterproof and resistant to low temperature and corrosion.

Other technical characteristics of Embodiment 2 are the same as those of Embodiment 1.

Embodiment 3

The structural health detection system further comprises a strain gauge which is attached to the inner wall of a steel pipe and connected with the processor in the annular data integrated package through the wire. The strain gauge is able to acquire information in the hollow steel pipe and transmit the information to the annular data integrated package, and then the information is transmitted to the outside through the wireless data transmitter.

Other technical characteristics of Embodiment 3 are the same as those of Embodiment 2.

Embodiment 4

This embodiment differs from Embodiment 1 in that the external fully-fabricated steel pipe column consists of three external fully-fabricated steel pipe column sheets, each external fully-fabricated steel pipe column sheet has a central angle of 120°, an angle between the protruding steel plate wings of the core steel frame is 120°, the number of protruding beams is three, the number of the core beam-column connecting pieces is three, and the angle between the beams is 120°.

Other technical characteristics of Embodiment 4 are the same as those of Embodiment 1.

Embodiment 5

Figure 5:
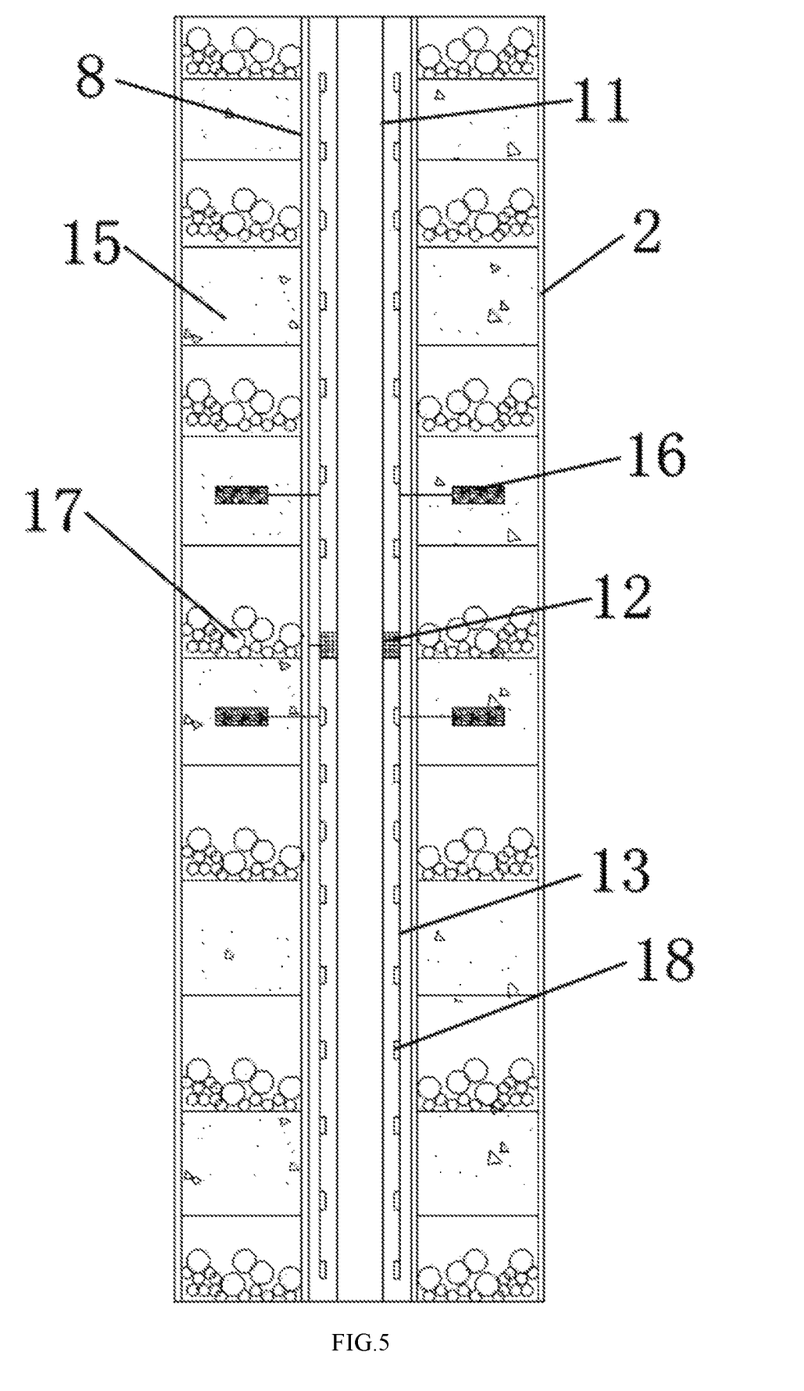
FIG. 5 is a longitudinal sectional view of a steel pipe column of the invention.
Figure 7:
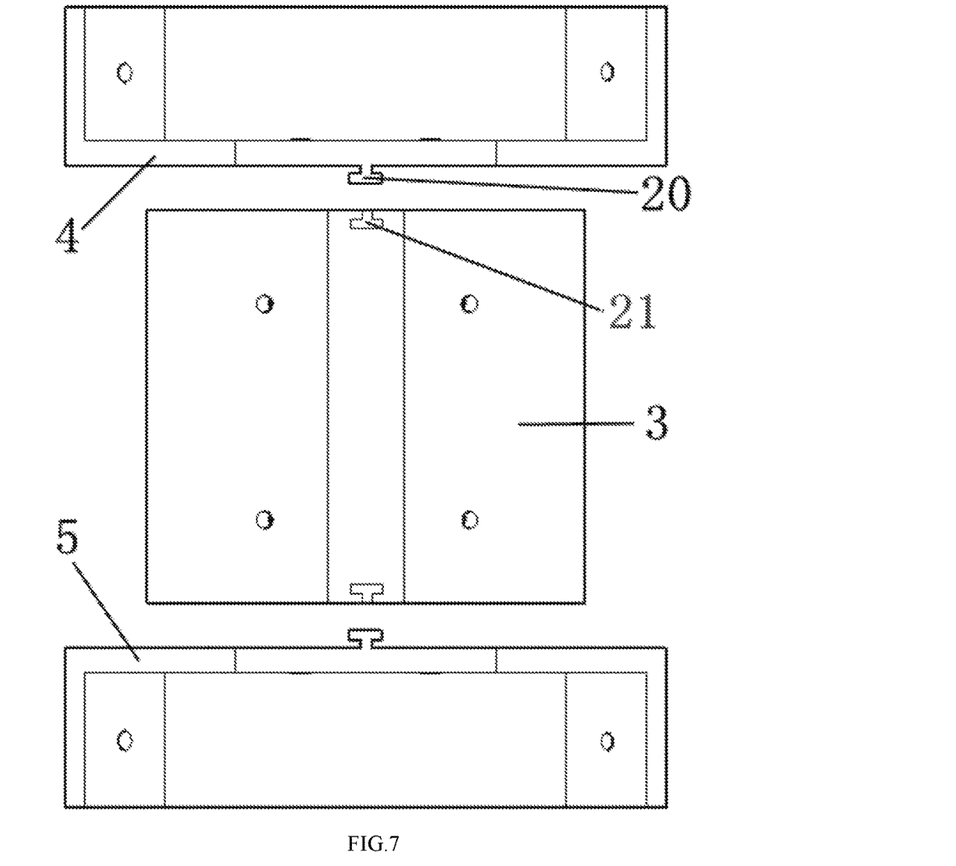
FIG. 7 is a planar structural view of a fully-fabricated annular beam-column connecting assembly of the invention.
Figure 8:
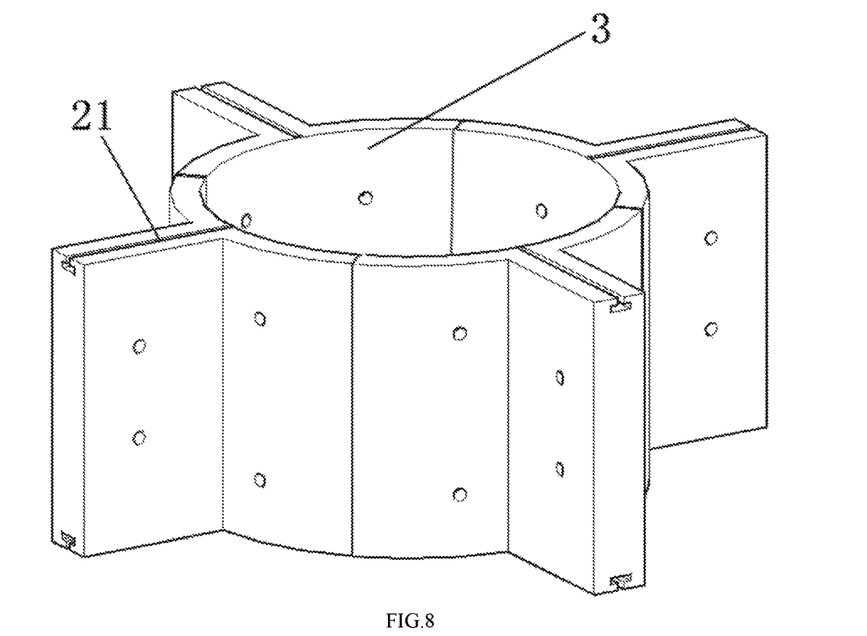
FIG. 8 is a perspective view of a core beam-column connecting piece of the invention.
Figure 9:
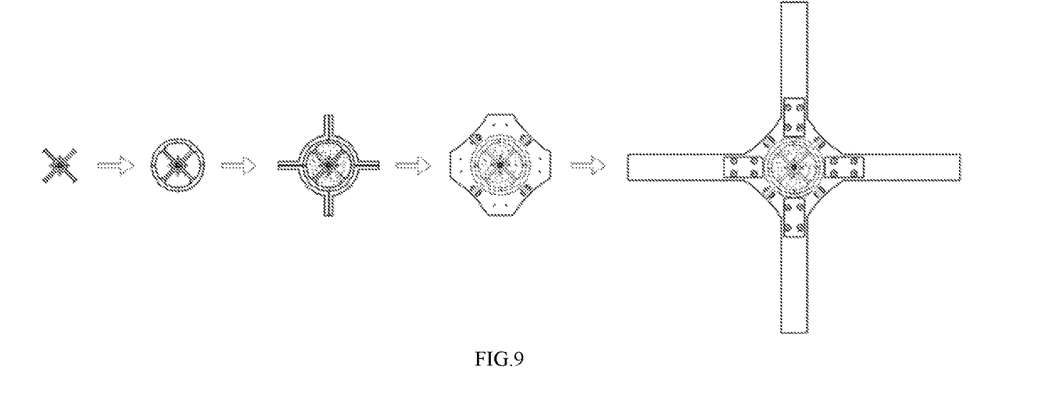
FIG. 9 is an assembly diagram of Embodiment 1 of the invention.

As shown in FIG. 1-FIG. 11, the invention further relates to an assembly method of the fabricated intelligent joint provided with particle damping chambers for energy dissipation. The assembly method comprises the following steps:

(1) Inspection of the structural health detection system: the wire having an end connected with the strain gauge in the hollow steel pipe of the core steel frame and an end attached to end openings of the sections, located in the circular hollow steel keel, of the FBG intelligent sensing elements is connected to the annular data integrated package, and the structural health detection system operates to be inspected;

(2) Installation of the structural health detection system: after operation and inspection, the annular data integrated package is disposed around the principal line pipe which is placed in the circular hollow steel keel of the core steel frame;

(3) Positioning of the core steel frame: the core steel frame is positioned according to the position and height of the column, and the core beam-column connecting pieces are aligned to bolt holes to be connected with the column sheets according to a design height of the structural beams;

(4) Assembly of the external fully-fabricated steel pipe column: the sliding grooves in the first external fully-fabricated steel pipe column sheet are placed above the connecting teeth of the corresponding protruding steel plate wing of the core steel frame to be aligned to the connecting teeth, and then the column sheet is slid along the sliding grooves to a specific position; and the remaining external fully-fabricated steel pipe column sheets are operated in the same way, and the column sheet connecting teeth between the column sheets are aligned to the column sheet sliding grooves and are then slid to specific positions to form the external fully-fabricated steel pipe column;

(5) Installation of the fully-fabricated annular beam-column connecting assembly: the core beam-column connecting pieces are connected with the external fully-fabricated steel pipe column sheets through bolts;

(6) Installation of the particle damping chambers: one particle damping chamber is installed in the space between the circular hollow steel keel of the core steel frame and the external fully-fabricated steel pipe column; and the T-shaped slides 19 of the particle damping chamber are aligned to the T-shaped connecting teeth outside the hollow steel pipe to slide the particle damping chamber to the bottom;

(7) Concrete pouring: fiber concrete 15 is poured above the particle damping chamber by a thickness which is not greater than that of the particle damping chamber;

(8) Installation of sensors: Step (6) and Step (7) are repeated until the column is half filled; after the particle damping chamber is installed, fiber concrete is poured by half of the thickness of the fiber concrete, an end outside an end opening of the circular hollow steel keel of the wire is connected to one FBG intelligent sensing element via the wire hole and is placed above the poured concrete, and concrete is poured again by the other half to bury the FBG intelligent sensing element; then the particle damping chamber is slid into the space between the circular hollow steel keel of the core steel frame and the external fully-fabricated steel pipe column to be located above the concrete and make contact with the concrete, and then fiber concrete is poured; the step is repeated to sequentially bury the remaining FBG intelligent sensing elements; and the step is performed in four spaces formed between the circular hollow steel keel of the core steel frame and the external fully-fabricated steel pipe column until the space in the column is full of the fiber concrete and the particle damping chambers;

(9) Installation of the arc connecting tiles: the arc connecting tile connecting teeth 20 of the upper arc connecting tiles are slid in position along the core beam-column connecting piece sliding grooves 21 in the upper sides of the core beam-column connecting pieces, and the connecting teeth of the lower arc connecting tiles are slid in position along the sliding grooves in the lower sides of the core beam-column connecting pieces, so that upper and lower external reinforcing rings are formed; the arc connecting tiles are connected through bolts; and the steel beams and the core beam-column connecting pieces are connected through bolts;

(10) Operation of the structural health detection system; and (11) Installation of the steel beams: the steel beams and the fully-fabricated annular beam-column connecting assembly are connected through bolts to form the whole joint.

Clearly, the above embodiments are only preferred ones of the invention and should not be regarded as limitations of the scope of all possible embodiments of the invention. The invention is not limited to the above embodiments. All equivalent transformations and improvements made by those ordinarily skilled in the art should also fall within the patent scope of the invention.

What is claimed is:

1. A fabricated intelligent joint provided with particle damping chambers for an energy dissipation, comprising: a core steel frame, an external fully-fabricated steel pipe column, a fully-fabricated annular beam-column connecting assembly, a structural health detection system and the particle damping chambers; wherein the core steel frame is located in the external fully-fabricated steel pipe column, and the core steel frame is concentric with the external fully-fabricated steel pipe column;

the core steel frame comprises a circular hollow steel keel and a plurality of protruding steel plate wings, the external fully-fabricated steel pipe column is formed by splicing a plurality of arc steel pipe column sheets, and a gap between the core steel frame and the external fully-fabricated steel pipe column is filled with a concrete;

the fully-fabricated annular beam-column connecting assembly comprises upper arc connecting tiles, lower arc connecting tiles and core beam-column connecting pieces adjacent arc connecting tiles of the fully-fabricated annular beam-column connecting assembly are connected through a first plurality of bolts to form an upper circular external reinforcing ring and a lower circular external reinforcing ring, wherein the upper circular external reinforcing ring is located on an upper side of the core beam-column connecting pieces and the lower circular external reinforcing ring is located on a lower side of the core beam-column connecting pieces to hoop the external fully-fabricated steel pipe column;

the core beam-column connecting pieces of the fully-fabricated annular beam-column connecting assembly is connected with the external fully-fabricated steel pipe column with a second plurality of bolts; steel beams are connected with the fully-fabricated annular beam-column connecting assembly through a third plurality of bolts to form the fabricated intelligent joint; and the particle damping chambers are located in the gap between the external fully-fabricated steel pipe column and the core steel frame, and a large quantity of spherical rubber particles are contained in the particle damping chambers.

2. The fabricated intelligent joint provided with the particle damping chambers for the energy dissipation according to claim 1, wherein, the particle damping chambers and the concrete are alternately distributed in the gap between the core steel frame and the external fully-fabricated steel pipe column.

3. The fabricated intelligent joint provided with the particle damping chambers for the energy dissipation according to claim 1, wherein, T-shaped connecting teeth are arranged between the plurality of protruding steel plate wings outside the circular hollow steel keel, each of the plurality of protruding steel plate wings has a full length, and T-shaped slides matched with the T-shaped connecting teeth are formed in inner sides of the particle damping chambers.

4. The fabricated intelligent joint provided with the particle damping chambers for the energy dissipation according to claim 1, wherein, the structural health detection system comprises a principal line, a wire, FBG intelligent sensing elements, a processor, a long-life power supply and a wireless data transmitter, wherein the structural health detection system is located on a principal line pipe in the circular hollow steel keel of the core steel frame, an annular data integrated package comprises the processor, the wireless data transmitter and the long-life power supply, wherein the annular data integrated package wraps the principal line pipe, the wire and the principal line connected with the wire are wrapped in the principal line pipe the principal line pipe is connected with the annular data integrated package through a hole formed in the principal line pipe, a wire hole is formed in the circular hollow steel keel, the wire penetrates through the wire hole to connect the FBG intelligent sensing elements to the processor, and the FBG intelligent sensing elements and the wire corresponding to the FBG intelligent sensing elements are embedded in a fiber concrete.

5. The fabricated intelligent joint provided with the particle damping chambers for the energy dissipation according to claim 4, wherein, the structural health detection system further comprises a strain gauge, wherein the strain gauge is attached to an inner wall of a steel pipe, and the strain gauge is connected with the annular data integrated package through the wire.

6. The fabricated intelligent joint provided with the particle damping chambers for the energy dissipation according to claim 4, wherein, the annular data integrated package is wrapped with a polyurea skin.

7. The fabricated intelligent joint provided with the particle damping chambers for the energy dissipation according to claim 1, wherein, shells of the particle damping chambers are made from a light high-strength fiber material.

8. The fabricated intelligent joint provided with the particle damping chambers for the energy dissipation according to claim 1, wherein, each of the plurality of arc steel pipe column sheets of the external fully-fabricated steel pipe column comprises a first side and a second side, wherein the first side is provided with column sheet connecting teeth and the second side is provided with column sheet sliding grooves, and the column sheet sliding grooves are matched with the column sheet connecting teeth; connecting teeth are arranged at ends of the plurality of protruding steel plate wings and are distributed within a full length of each of the plurality of protruding steel plate wings, and sliding grooves matched with clamping teeth of the plurality of protruding steel plate wings are formed in inner sides of the plurality of arc steel pipe column sheets.

9. An assembly method of a fabricated intelligent joint provided with particle damping chambers for an energy dissipation, comprising the following steps:
  (1) inspecting a structural health detection system, wherein a first wire is connected to an end of a second wire of FBG intelligent sensing elements, wherein the end of the second wire is connected to a circular hollow steel keel, the first wire is connected to an annular data integrated package, and the structural health detection system operates to be inspected;
  (2) installing the structural health detection system, wherein, after the structural health detection system operates to be inspected, the annular data integrated package is disposed around a principal line pipe, and the principal line pipe is placed in the circular hollow steel keel of the core steel frame;
  (3) positioning the core steel frame, wherein the core steel frame is positioned according to a position and a height of a column, and core beam-column connecting pieces are aligned to bolt holes connected with column sheets according to a design height of a structural beam;
  (4) assembling external fully-fabricated steel pipe columns, wherein sliding grooves in a column sheet of a first external fully-fabricated steel pipe column of the external fully-fabricated steel pipe columns are placed above connecting teeth of a protruding steel plate wing of the core steel frame to be aligned to the connecting teeth, and then the column sheet slides along the sliding grooves to a predetermined position; column sheets of remaining external fully-fabricated steel pipe column of the external fully-fabricated steel pipe columns are operated in the above method in the step (4), column sheet connecting teeth between the column sheets are aligned to column sheet sliding grooves and slide to predetermined positions to form the external fully-fabricated steel pipe column;
  (5) installing a fully-fabricated annular beam-column connecting assembly, wherein the core beam-column connecting pieces are connected with the column sheets of the external fully-fabricated steel pipe column through a first plurality of bolts;
  (6) installing the particle damping chambers, wherein the particle damping chambers are installed in a space formed between the circular hollow steel keel of the core steel frame and the external fully-fabricated steel pipe column;
  (7) pouring a fiber concrete, wherein the fiber concrete is poured above the particle damping chambers by a thickness of the fiber concrete, wherein the thickness of the fiber concrete is not greater than a thickness of the particle damping chambers;
  (8) installing sensors, wherein the step (6) and the step (7) are repeated until the external fully-fabricated steel pipe column is half filled; after the particle damping chambers are installed, the fiber concrete is poured by a first half of the thickness of the fiber concrete, an end of the first wire outside an end opening of the circular hollow steel keel is connected with one FBG intelligent sensing element of the FBG intelligent sensing elements via a wire hole to be placed above a poured concrete, and the fiber concrete is poured again by a second half of the thickness of the fiber concrete to bury the one FBG intelligent sensing element; then a particle damping chamber of the particle damping chambers slides into the space formed between the circular hollow steel keel of the core steel frame and the external fully-fabricated steel pipe column to be located above the fiber concrete and make contact with the fiber concrete, and the fiber concrete is poured; above steps in the step (8) are repeated to sequentially bury the remaining FBG intelligent sensing elements of the FBG intelligent sensing elements; the step (8) is performed in four spaces formed by the circular hollow steel keel of the core steel frame and the external fully-fabricated steel pipe column synchronously until a space in the external fully-fabricated steel pipe column is full of the fiber concrete and the particle damping chambers;

(9) installing arc connecting tiles: T-shaped teeth of upper arc connecting tiles of the arc connecting tiles slide in position along T-shaped sliding grooves in upper sides of the core beam-column connecting pieces, and T-shaped teeth of lower arc connecting tiles of the arc connecting tiles slide in position along T-shaped sliding grooves in lower sides of the core beam-column connecting pieces, to form an upper external reinforcing ring and a lower external reinforcing ring; the arc connecting tiles are connected through a second plurality of bolts; and steel beams are connected with the core beam-column connecting pieces through a third plurality of bolts; and (10) operating the structural health detection system.

10. The assembly method of the fabricated intelligent joint provided with the particle damping chambers for the energy dissipation according to claim 9, wherein, the step (6) further comprises: aligning T-shaped slides of the particle damping chamber to T-shaped connecting teeth outside the hollow steel pipe to allow the particle damping chamber to slide to a bottom.

* * * * *